F. FISHER.
SYSTEM OF TRANSMITTING SIGNALS ELECTRICALLY THROUGH CONDUCTORS.
APPLICATION FILED FEB. 3, 1910.
993,046.
Patented May 23, 1911.
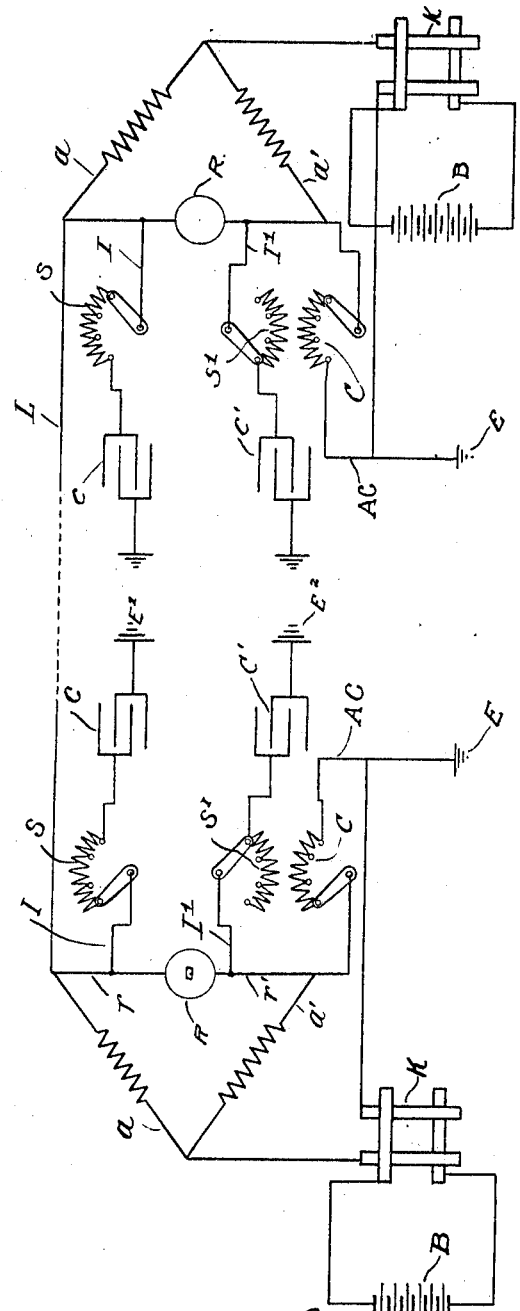

UNITED STATES PATENT OFFICE.

FRANK FISHER, OF NEW YORK, N. Y.

SYSTEM OF TRANSMITTING SIGNALS ELECTRICALLY THROUGH CONDUCTORS.

993,046. Specification of Letters Patent. Patented May 23, 1911.

Application filed February 3, 1910. Serial No. 541,922.

*To all whom it may concern:*

Be it known that I, FRANK FISHER, a subject of the King of the United Kingdom of Great Britain and Ireland, and a resident of the borough of Brooklyn, in the city of New York, county of Kings, and State of New York, have invented certain new and useful Improvements in Systems of Transmitting Signals Electrically Through Conductors, of which the following is a specification, reference being had therein to the accompanying drawings, which form a part thereof.

My invention relates to systems of transmitting signals electrically through conductors and more particularly to means for relieving the receiving coil from inductive disturbances.

The main object of the invention is to provide a system of transmitting signals electrically through conductors, wherein the receiving instrument will not be affected by inductive disturbances in the line due to a variance in the earth's potential.

A further object is to provide in such a system, means whereby all inductive disturbances will be neutralized, or absorbed, before reaching the receiver thus creating a neutral zone about the receiver, and permitting only the sending current to affect it thereby insuring reliability in the action of said receiver.

A still further object is to provide a system of this kind, which will be especially adapted for use in multiplex telegraphy, either in aerial lines or in submarine cables, and which will protect the receiver from inductive disturbances, whether such arise from atmospheric conditions, the presence of charged, electrical conductors in close juxtaposition to the line, or self-induction at any point of the system.

A still further object is to provide a system of this character wherein the return current may be through the earth, thus avoiding the necessity for a complete metallic circuit, with special windings or other expedients to eliminate or neutralize such disturbances.

A still further object is to provide a system capable of use with a multiplex telegraph system employing a bridge similar to the Wheatstone bridge, wherein the resistance on opposite sides of the receiver may be permanently balanced, so as to avoid the necessity for frequent readjustment to balance the resistances in the main line and in the artificial cable, to permit the duplex or multiplex working of the main line.

A still further object is to provide a system wherein the residuary current in the receiving coil, due to self-induction, will be rapidly discharged to avoid the retardation of the sending current by reason of such residuary current in the said coil, thus not only increasing the capacity of the receiving coil for rapid work, whether manual or automatic, through the elimination of this residuary current, but also permitting the use of light tensioned springs upon the receiving armature which will aid in accomplishing the same result.

A still further object is to provide a system of this character wherein the ground connection of the receiving instrument may be made adjacent thereto, and any inductive disturbances due to the variance in the potential of the earth adjacent to this ground connection would be so neutralized about the receiver itself, as to prevent the energizing or deënergizing of the said receiver by such disturbances.

The invention consists primarily in a system of transmitting signals electrically through conductors, embodying therein a sending instrument, and a receiving instrument connected therewith, said receiving instrument being arranged in a zone insensible to inductive disturbances in the system; and in such other novel arrangements of parts as are hereinafter set forth and described and more particularly set forth in the claims hereto appended.

The accompanying drawing is a diagrammatic showing of my system as applied to a submarine cable.

In a system of this character each end of the line is provided with a sending and receiving instrument, and the arrangement at each end is similar to that at the other, this device being especially applicable to multiplex work.

In the accompanying drawings, I have shown at B the batteries at opposite terminals of the line L, and at K the sending keys by means of which the current is impressed upon the line. The keys shown in the drawings are the ordinary reversing keys used in submarine cable work and the wiring shown in connection therewith is the ordinary wiring with such a key. This type of key and wiring is non-essential to the invention and is shown merely for illustrating the application of the invention to submarine cable work wherein it will have especial applicability. One contact of the key K is in electrical connection with the line L and with the earth connection AC, by the branch wires $a$ $a'$ extending on opposite sides of the receiver R. The line AC is connected to earth at E and contains therein a resistance C preferably in the form of a variable rheostat whereby the resistance of the earth connection AC may be brought to exactly balance with the resistance of the line L. The line AC, and its contained resistance, corresponds with the ordinary artificial cable of submarine cable practice but differs therefrom in the particularity that it may have its ground at the sending station and thus avoid a long length of cable necessary to secure ground at a distant point for the purpose of minimizing inductive disturbances due to the changes in the earth's potential. The receiving instrument R is in electrical connection by means of the conductors $r$ $r'$ with the main line L and with the ground line AC, the general arrangement being that of the ordinary Wheatstone bridge. This arrangement heretofore described, with the exception of the point at which ground is had for the line AC, is the ordinary wiring of a submarine cable or other multiplex telegraphic system and no claim of invention is made thereto. With the present practice, however, it is necessary to preserve a condition of equal resistance in the main line and in the artificial cable or ground line, by frequent balancing of these two lines owing to the inductive disturbances in one line or the other resulting from the change of potential in the earth or in the air. A loss of this balance not only interferes with the sending current, causing it to energize the receiving coil, but the inductive disturbances resulting therefrom (which are always present in the system to a greater or less extent) have the same effect upon the receiving coil and thus interfere with the receiving of messages as well as the sending thereof. When a delicate receiving instrument such as a siphon receiver is used, such disturbances during a storm frequently necessitate the abandonment of duplex working or of even simplex working when conditions are very bad. It is to obviate this difficulty, that I have produced my present system which is based upon the creation of a zone insensible to inductive disturbances throughout the system about the receiving instrument, thus isolating this system to all impulses excepting those of the receiving current.

In carrying out my invention, I have proceeded upon the premise that the potential of the earth at any point is uniform and that by locating shunt circuits on opposite sides of the receiver, running to ground, the conditions upon both sides of said receiver will always be uniform, and thus preclude the passage of induced currents through said system whether from ground, or from the line L. These shunt circuits include therein suitable instruments adapted to absorb or dissipate induced currents, or discharge them to ground. Preferably the instruments referred to consist of the resistance $s$ or $s'$ connected in series with the condenser $c$ or $c'$, the ground connection being at $E'$ $E^2$ respectively, the ground of these shunt circuits being taken at substantially the same point as the ground E. I connect the resistances and the condensers in series, with the former nearer the receiver to increase the tension of the current passing to the latter. By this arrangement it will be observed that when a balance is once secured in the system between the line L and the ground connection AC, the receiver is not affected by the sending current; and that the receiving current, (assuming the impulse to be a positive impulse) will pass from L to R through $r$, from R to $r'$, and through the resistance C to ground through the line AC, the shunt circuits I I', through the condensers $c$ $c'$ forming a perfect insulation so far as the voltaic current is concerned. If the system employed uses an induced current instead of a direct voltaic current, this may be compensated for by regulating the capacity of the condensers $c$ $c'$ so that the pulsating receiving current will not charge same, thus eliminating all pulsating currents of a frequency not corresponding with that of the receiving current. If there be a variance in the earth's potential at either station, any induction in the line AC will be neutralized at the point of joinder of the shunt line I' with the line $r'$ through the similar polarity at this point and a similar polarity will be maintained on opposite sides of the receiver by reason of the arrangement, location and manner of coupling of the shunt circuits I I', thus creating a neutral zone within which is the receiver. It is also apparent that if such inductive disturbances occur along the line L whether such result from faults in the line, the presence of adjacent charged electrical conductors or any reason whatsoever, such pulsating currents will be shunted to ground through the line I, resistance $s$ and condenser $c$, thus protecting the receiving instrument from all such pulsating currents, or else be eliminated or absorbed by a current of similar polarity, intensity and frequency at the point of connection of the line I and $r$. This elimination of induced currents throughout the system will not affect the sending current or the receiving current and the receiver will, therefore, act with absolute reliability. Furthermore, it is apparent that the line L being once balanced, no changes in the earth's potential can affect this balance in any manner whatsoever, thus avoiding those losses in time, and those errors resulting from the temporary loss of balance in the system.

When messages are being transmitted with great rapidity, whether such messages be sent by hand or automatically, there is sometimes a residuum in the receiving coil, due to self-induction which interferes with the proper recording of the messages. I have found that the arrangement of shunt circuits above described also eliminates this difficulty and permits a more rapid sending of messages than is possible with the ordinary multiplex system.

It is not my intention to limit my invention to the details of this system shown in the accompanying drawings, such showing being merely for purposes of illustration. I believe it to be broadly new to provide in a system of this character a receiving instrument arranged in a zone insensible to inductive disturbances in the system, and I intend to claim such broadly.

Having described the invention, what I claim as new, and desire to have protected by Letters Patent, is:—

1. A system of the character described embodying therein a sending instrument and a receiving instrument connected by an electrical conductor, or line, said receiving instrument being connected to ground, and the line on opposite sides of said receiving instrument being connected to ground through shunt circuits to ground containing therein respectively a resistance and a condenser coupled in series, the resistance being between the condenser and the receiver.

2. A system of the character described embodying therein an electrical conductor, or line, means for impressing current impulses on said line, receivers, each terminal of said line being connected with said means for impressing current impulses on said line and with one of said receivers, the terminals of which receiver are respectively in connection with said line and with local ground, and shunt circuits on opposite sides of said receiver to local ground, containing therein respectively a resistance and a condenser coupled in series, the resistance being between the condenser and the receiver.

3. A system of the character described embodying therein a sending instrument and a receiving instrument including therein an electro-magnet, an electrical conductor connecting said instruments, said electro-magnet being connected to local earth through a conductor equaling in resistance the resistance of said first named conductor, a shunt circuit extending from said connection adjacent to said electro-magnet to ground, said shunt circuit including therein a resistance and a condenser coupled in series.

4. A system of the character described embodying therein a line, a sender for impressing current impulses on said line, a receiver the terminals of which are respectively in connection with said line and with ground through a resistance equaling the resistance of said line, an electrical connection between said resistance and said sender, and shunt circuits on opposite sides of said receiver to ground containing therein a resistance and a condenser coupled in series, whereby inductive disturbances throughout the system will be shunted to earth on either side of, said receiver.

5. A system of the character described embodying therein a line, a sender for impressing current impulses on said line, a receiver the terminals of which are respectively in connection with said line and with ground through a resistance equaling the resistance of said line, an electrical connection between said resistance and said sender, and shunt circuits on opposite sides of said receiver to ground containing therein a variable resistance and a condenser coupled in series, whereby inductive disturbances throughout the system will be shunted to earth on either side of, said receiver.

6. A system of the character described embodying therein a line, a sender for impressing current impulses on said line, a receiver the terminals of which are respectively in connection with said line and with ground through a resistance equaling the resistance of said line, and electrical connection between said resistance and said sender, and shunt circuits on opposite sides of said receiver to ground containing therein a resistance and an adjustable condenser coupled in series, whereby inductive disturbances throughout the system will be shunted to earth on either side of, said receiver.

7. A system of the character described, embodying therein a line, a sender for impressing current impulses on said line, a receiver the terminals of which are respectively in connection with said line and with ground through a resistance equaling the resistance of said line, an electrical connection between said resistance and said sender, and shunt circuits on opposite sides of said receiver to ground containing therein a variable resistance and an adjustable condenser coupled in series, whereby inductive disturbances throughout the system will be shunted to earth on either side of, said receiver.

8. A system of the character described, embodying therein a line, a Wheatstone bridge, the terminals of which are respectively connected with said line, and with a variable resistance to ground beyond the bridge, a sender for impressing current impulses on said line, a receiver located in the bridge, and shunt circuits on opposite sides of said receiver to ground containing therein a resistance and a condenser coupled in series, whereby inductive disturbances throughout the system will be shunted to earth on either side of the receiver and a condition of similar polarity will be preserved on opposite sides of said receiver.

In witness whereof, I have hereunto affixed my signature, this 1st day of February, 1910, in the presence of two witnesses.

FRANK FISHER.

Witnesses:
F. T. WENTWORTH,
P. V. WENING.